(12) United States Patent
Yan

(10) Patent No.: US 10,397,783 B2
(45) Date of Patent: Aug. 27, 2019

(54) METHOD AND APPARATUS FOR PROVIDING A REMOTE LOST-AND-FOUND SERVICE

(71) Applicant: Nokia Technologies Oy, Espoo (FI)

(72) Inventor: Qifeng Yan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 169 days.

(21) Appl. No.: 15/136,012

(22) Filed: Apr. 22, 2016

(65) Prior Publication Data

US 2016/0242217 A1 Aug. 18, 2016

Related U.S. Application Data

(63) Continuation of application No. 12/731,791, filed on Mar. 25, 2010, now abandoned.

(51) Int. Cl.
| | |
|---|---|
| *H04L 12/26* | (2006.01) |
| *H04W 12/08* | (2009.01) |
| *H04W 4/02* | (2018.01) |
| *H04L 29/08* | (2006.01) |
| *H04W 4/00* | (2018.01) |
| *G08B 21/24* | (2006.01) |
| *H04W 4/70* | (2018.01) |
| *H04W 76/11* | (2018.01) |

(52) U.S. Cl.
CPC ............ *H04W 12/08* (2013.01); *G08B 21/24* (2013.01); *H04L 43/065* (2013.01); *H04L 67/025* (2013.01); *H04L 67/303* (2013.01); *H04W 4/025* (2013.01); *H04W 4/70* (2018.02); *H04W 76/11* (2018.02)

(58) Field of Classification Search
CPC ..... G08B 21/24; H04L 43/065; H04L 67/025; H04L 67/303; H04W 12/08; H04W 4/005; H04W 4/025; H04W 76/021
See application file for complete search history.

(56) References Cited

U.S. PATENT DOCUMENTS 5,576,692 A 11/1996 Tompkins et al.
5,878,116 A 3/1999 Scott
(Continued)

FOREIGN PATENT DOCUMENTS

WO 2010006651 A1 1/2010

OTHER PUBLICATIONS

Sierra, "Affordable GPS Tracking Device for Finding Lost Items", Unique Gift Ideas, May 26, 2009, retrieved on Apr. 18, 2016 from http://www.ladiesgadgets.com/affordable-gps-tracking-device-for-finding-lost-items/, 4 Pages.
(Continued)

*Primary Examiner* — Quan-Zhen Wang
*Assistant Examiner* — Rajsheed O Black-Childress
(74) *Attorney, Agent, or Firm* — Ditthavong & Steiner, P.C.

(57) ABSTRACT

An approach is provided for a remote lost-and-found service. A local sensor manager causes, at least in part, pairing of a device and a local sensor. The local sensor manager then determines when the local sensor is beyond a predetermined distance from the device, and causes, at least in part, a change in a profile status of the local sensor based on the determination. The profile status specifies, at least in part, a visibility of the local sensor to one or more other devices.

20 Claims, 12 Drawing Sheets

(56) References Cited

U.S. PATENT DOCUMENTS

| | | |
|---|---|---|
| 6,259,367 B1 | 7/2001 | Klein |
| 6,515,588 B1 | 2/2003 | Sarabia |
| 6,714,121 B1 | 3/2004 | Moore |
| 7,023,344 B2 | 4/2006 | Schaper |
| 7,181,252 B2 | 2/2007 | Komsi |
| 7,236,091 B2 | 6/2007 | Kiang et al. |
| 7,323,988 B2 | 1/2008 | Krstulich |
| 7,327,251 B2 | 2/2008 | Corbett, Jr. |
| 8,085,148 B2 | 12/2011 | Reed et al. |
| 8,169,316 B2 | 5/2012 | Freathy et al. |
| 2003/0043036 A1 | 3/2003 | Merrem et al. |
| 2004/0002998 A1 | 1/2004 | Takahashi et al. |
| 2004/0192333 A1 | 9/2004 | Khokhar |
| 2005/0137943 A1 | 6/2005 | Holzman |
| 2006/0012476 A1 | 1/2006 | Markhovsky et al. |
| 2006/0201447 A1* | 9/2006 | Meadows .............. A01K 29/00 119/720 |
| 2006/0250255 A1 | 11/2006 | Flanagan |
| 2007/0123287 A1* | 5/2007 | Mock .................. H04L 41/0686 455/518 |
| 2007/0197229 A1 | 8/2007 | Kalliola et al. |
| 2007/0241901 A1 | 10/2007 | Cage et al. |
| 2008/0014869 A1 | 1/2008 | Demirbasa et al. |
| 2008/0191846 A1 | 8/2008 | Chang |
| 2009/0045958 A1 | 2/2009 | Spano |
| 2010/0148966 A1 | 6/2010 | Vuppala et al. |
| 2010/0223245 A1 | 9/2010 | Vermilye |
| 2010/0305843 A1 | 12/2010 | Yan et al. |
| 2011/0028147 A1 | 2/2011 | Calderhead, Jr. et al. |
| 2011/0047015 A1 | 2/2011 | Twitchell, Jr. |
| 2011/0210849 A1 | 9/2011 | Howard et al. |
| 2012/0265623 A1* | 10/2012 | Zhu ..................... G06K 7/1095 705/16 |

OTHER PUBLICATIONS

LOC8TOR. Accessed: May 24, 2010, https://www.loc8torcom/store, pp. 1.

* cited by examiner

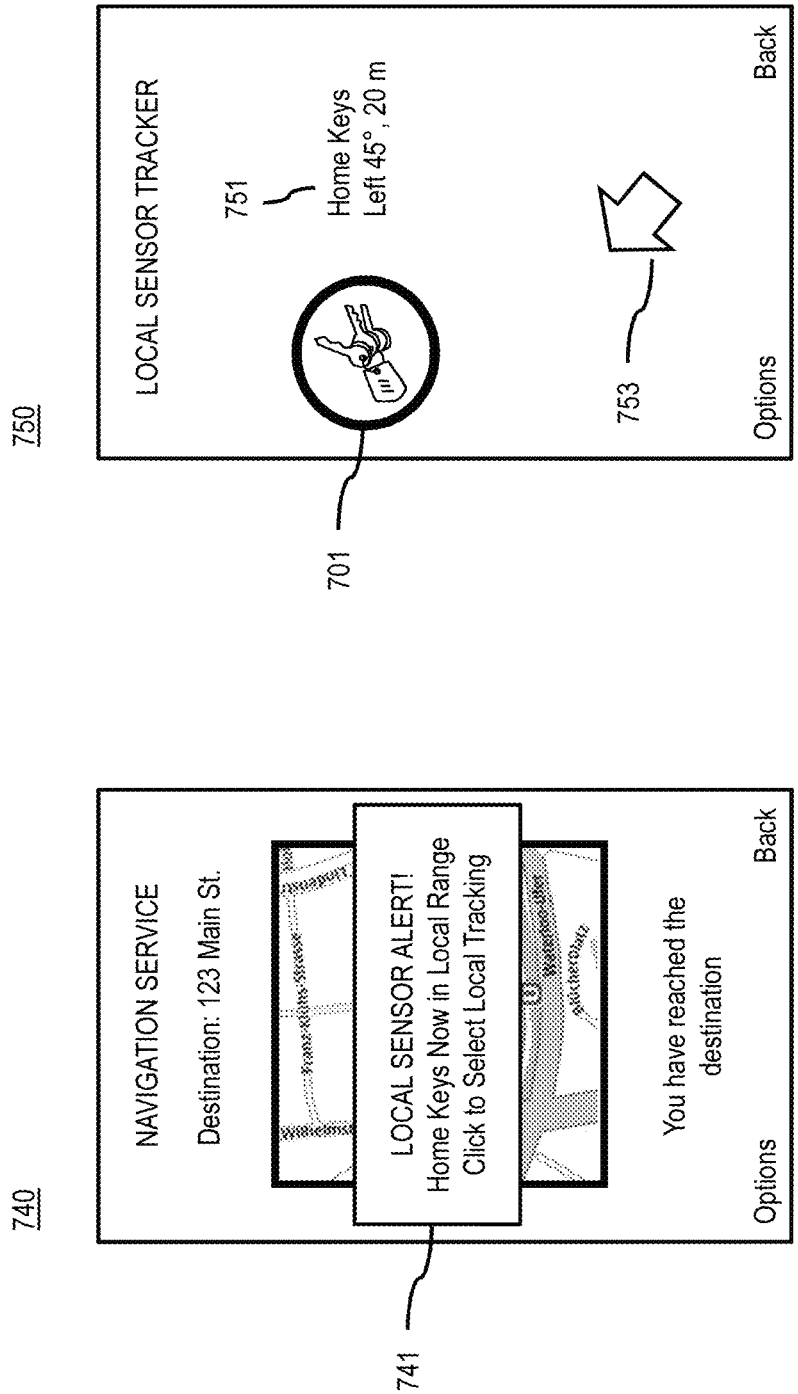

METHOD AND APPARATUS FOR PROVIDING A REMOTE LOST-AND-FOUND SERVICE

RELATED APPLICATIONS

This application is a continuation of U.S. patent application Ser. No. 12/731,791, filed Mar. 25, 2010, entitled "Method and apparatus for providing a remote lost-and-found service", the entireties of which are incorporated by reference.

BACKGROUND

Service providers (e.g., wireless and cellular services) and device manufacturers are continually challenged to deliver value and convenience to consumers by, for example, providing compelling network services and advancing the underlying technologies. One area of interest has been the development of services and technologies for tracking and locating items such as lost or misplaced items. By way of example, traditional tracking and location services are often based on various technologies (e.g., radio frequency identification (RFID), global positioning system (GPS), etc.). These technologies, however, can be subject to a variety of limitations such as limited range, high power demand, susceptibility to interference, need for clear line of sight, and the like. Moreover, these services may also depend on manual entry for reporting of lost items or for specifying identifiers (e.g., tracking codes) associated with items to be tracked or located. Accordingly, service providers and device manufacturers face significant technical challenges in overcoming the limitations and burden (e.g., time and resource burdens) associated with traditional tracking and locating services.

SOME EXAMPLE EMBODIMENTS

Therefore, there is a need for an approach for automatically and efficiently providing a lost-and-found service for remotely locating items tagged with, for instance, a local sensor in collaboration with other devices.

According to one embodiment, a method comprises causing, at least in part, pairing of a device and a local sensor. The method also comprises determining when the local sensor is beyond a predetermined distance from the device. The method further comprises causing, at least in part, a change in a profile status of the local sensor based on the determination. The profile status specifies, at least in part, a visibility of the local sensor to one or more other devices.

According to another embodiment, an apparatus comprising at least one processor, and at least one memory including computer program code, the at least one memory and the computer program code configured to, with the at least one processor, cause, at least in part, pairing of a device and a local sensor. The apparatus is also caused to determine when the local sensor is beyond a predetermined distance from the device. The apparatus is further causes, at least in part, a change in a profile status of the local sensor based on the determination. The profile status specifies, at least in part, a visibility of the local sensor to one or more other devices.

According to another embodiment, a computer-readable storage medium carrying one or more sequences of one or more instructions which, when executed by one or more processors, cause, at least in part, pairing of a device and a local sensor. The apparatus is also caused to determine when the local sensor is beyond a predetermined distance from the device. The apparatus is further causes, at least in part, a change in a profile status of the local sensor based on the determination. The profile status specifies, at least in part, a visibility of the local sensor to one or more other devices.

According to another embodiment, an apparatus comprises means for causing, at least in part, pairing of a device and a local sensor. The apparatus also comprises means for determining when the local sensor is beyond a predetermined distance from the device. The apparatus further comprises means for causing, at least in part, a change in a profile status of the local sensor based on the determination. The profile status specifies, at least in part, a visibility of the local sensor to one or more other devices.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A-7F are diagrams of user interfaces utilized the processes of FIGS. 4-6, according to various embodiment;

DESCRIPTION OF SOME EMBODIMENTS

A method and apparatus for providing a remote lost-and-found service are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. In addition, although various embodiments are primarily described with respect to a lost-and-found service, it is contemplated that the approach described herein may be used with any other service for tracking and/or locating items, people, animals, or any other movable objects.

Figure 1:
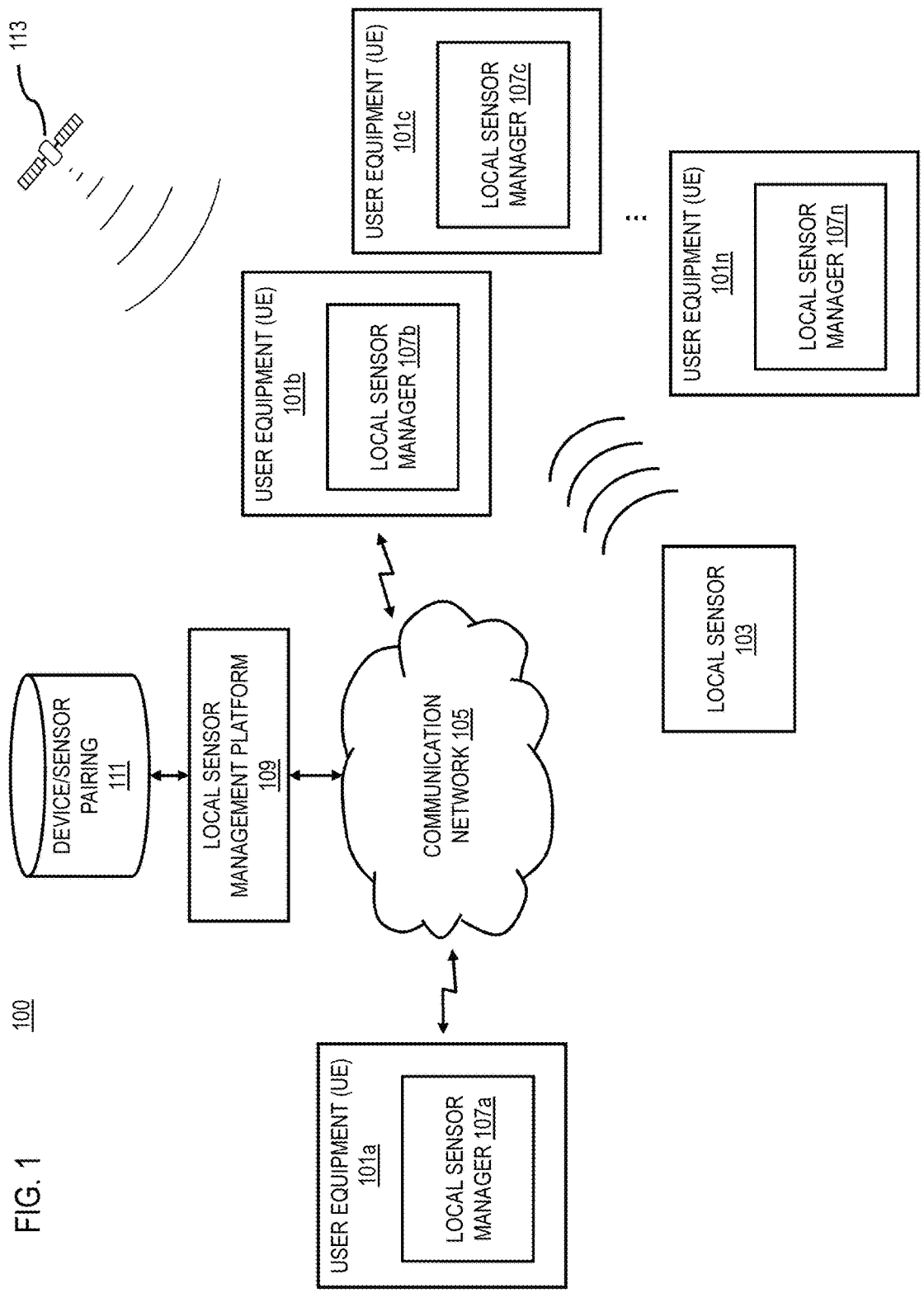
FIG. 1 is a diagram of a system capable of providing a remote lost-and-found service, according to one embodiment.

FIG. 1 is a diagram of a system capable of providing a remote lost-and-found service, according to one embodiment. As noted previously, technology-based tracking and locating services (e.g., RFID or GPS based lost-and-found services) are becoming increasingly popular among consumers, particularly for locating easily lost or stolen items such as electronics, keys, pets, cars, and the like. However, these traditional approaches to tracking and location items suffer from any of a number of limitations. For example, one approach attaches RFID tags or other short range transponders to items for tracking, by, e.g., injecting tags under the skin of subject people or animals, adhering tags to the objects, etc. Once attached, the RFID tag and the associated item may be located using RFID readers or similar detectors. One drawback of this approach, however, is that RFID tags and like transponders typically have very short communication ranges that span, for instance, from several inches to a few hundred meters. As a result, if the RFID tag is beyond the range of the detector or reader, the associated item cannot be easily located.

Other approaches that provide for longer range tracking (e.g., GPS-enabled tags and transponders) suffer from yet other limitations that reduce their effectiveness for tracking and locating items. For example, GPS-enabled tags typically have high power consumption requirements to support, at least in part, an onboard GPS receiver and a transmitter for sending GPS coordinates to a receiving device. Accordingly, if an attached item is lost for an extended period of time and has no access to additional power supplies, the tag can quickly deplete its power reserves and will no longer be able to transmit its location for tracking. Moreover, such long range solutions are generally more complex and expensive than RFID-based solutions, which can further limit their application. Yet another limitation is that a GPS-enabled tag, for instance, often requires line-of-sight access to corresponding GPS satellites to determine its location. As a result, GPS-enabled tags historically do operate effectively or accurately when the tag is in an indoor environment. Therefore, if the item is lost indoors or in an environment where GPS reception is blocked or interfered with, the GPS-enable tag may not be able to provide its location for tracking.

To address this problem, a system 100 of FIG. 1 introduces to the capability to remotely locate an item associated with a local sensor. In one embodiment, the system 100 includes one or more user equipment (UEs) 101a-101n (e.g., also collectively referred to as UEs 101) capable of detecting a local sensor 103 that is, for instance, a tag or transponder using a short range communication link (e.g., near field communication (NFC) such as RFID, Bluetooth®, etc.). The local sensor 103 can then be tracked or located through the UEs 101 that are equipped with, for instance, a directional antenna (not shown) or other detector tuned to the local sensor 103. As used herein, the term "remotely locate" refers to the capability a UE 101a that is outside of the normal tracking range of the local sensor 103 to track the local sensor 103 by enabling other UEs 101b-101n that are nearby the out-of-range local sensor 103 to relay tracking or location information of the local sensor 103 to the UE 101a over, for instance, a communication network 105. In this way, the UE 101a can navigate to the local sensor 103 based on the location information provided by one or more of the UEs 101b-101n, thereby advantageously reducing the burden (e.g., device resources burden) associated with searching for the out-of-range local sensor 103 without the aid of the other UEs 101b-101n. In other words, the system 100 connects or otherwise links the UEs 101a-101n so that one or more of the UEs 101a-101b can provide local sensor 103 tracking information to other ones of the UEs 101a-101n when a particular one of the UEs 101a-101n is out of local tracking range of the local sensor 103.

In one embodiment, after navigating to within the vicinity of the local sensor 103 (e.g., within the local tracking range of the local sensor 103) based on the location information received from other UEs 101b-101n, the UE 101a can then reactivate its directional antenna or other detector to obtain direct local tracking or location information of the local sensor 103. In this way, the UE 101a can leverage the use of an external mapping or navigation service to come within range of the local sensor 103 and then switch to using its local detector or directional antenna to obtain more precise location information for finding the local sensor 103.

In another embodiment, the other UEs 101b-101n have limited visibility rights with respect the local sensor 103. More specifically, the UEs 101b-101n may only be able to detect the local sensor 103 if the local sensor 103 is out of range of the first UE 101a or when the local sensor 103 is out of range of the first UE 101a for more than a predetermined period of time. In certain embodiments, the local sensor 103 and the UE 101a are associated via a pairing process so that the out-of-range determination of the local sensor 103 is specific to the pair. By way of example, this pairing process may be mediated by a local sensor manager (e.g., one or more of the local sensor managers 107a-107n, also collectively known as local sensor manager 107) resident within the respective UEs 101, by a local sensor management platform 109 of the communication network 105 (e.g., a server or other network component), or a combination thereof. Pairing, for instance, ensures that only authorized devices (e.g., a paired device such as the UE 101a) can detect, view, or otherwise access the corresponding local sensor 103. As shown in FIG. 1, the local sensor management platform 109 may have connectivity to a database 111 of device/sensor pairings to provide a centralized network storage location for such pairing information. In addition or alternatively, the local sensor managers 107 may include respective pairing databases for storing pairing information.

In yet another embodiment, the local sensor 103 may be associated with a profile or status that determines its visibility to the other UEs 101b-101b. For example, the profile or status may include a private profile wherein the local sensor 103 is visible only to the device (e.g., the UE 101a) to which it is paired. In this way, only the paired device (e.g., the UE 101a) will be able to detect or locate the local sensor 103. Another profile may include a public profile wherein the local sensor 103 is visible and locatable by any paired or unpaired device. Yet another profile may include a detectable profile wherein the local sensor 103 can detected or located via non-paired devices (e.g., the UEs 101b-101n) but whose location information will only be accessible by paired device (e.g., the UE 101a) and/or the local sensor management platform 109 for relay to the pair device. More specifically, under the detectable profile of the local sensor 103, the other non-paired UEs 101b-101n become, for instance, remote detectors for the paired UE 101a and/or the local sensor management platform 109 without providing any of the tracking information in a user interface that is visible to users of the non-paired UEs 101b-101n. In this way, the system 100 advantageously guards against the possibility that the other UEs 101b-101n that are near the local sensor 103 can detect and retrieve the local sensor 103 and its associated item before the paired UE 101a can or without permission of the UE 101a.

In yet another embodiment, the UE 101a and/or the sensor management platform 109 may offer an incentive or reward to one or more of the other UEs 101b-101n to retrieve and return the local sensor 103 and associated item. For example, if the owner of the paired UE 101a is unable to travel to location of the local sensor 103 and retrieve it personally, the UE 101a and/or platform 109 may request that another UE 101b-101n retrieve the local sensor 103 for a reward. If the owner of the other UE 101b-101n accepts the request, the UE 101a and/or the platform 109 may grant visibility rights of the local sensor 103 to the accepting UE 101b-101n so that that the particular UE 101b-101n may detect and locate the local sensor 103.

As shown in FIG. 1 and as previously described above, the UEs 101a-101b have connectivity to each other over the communication network 105 for sharing location and related information about the local sensor 103. It is contemplated that the system 100 may support any number of UEs 101 up to the maximum capacity of the communication network 105. For example, the network capacity may be determined based, at least in part, on available bandwidth, available connection points, and/or the like. One or more of the UEs 101a-101n includes, for instance, a respective local sensor manager 107 (see the description of FIG. 3 below for a more detailed description of the local sensor manager 107) that comprises components and/or modules for tracking and locating the local sensor 103 (see the description of FIG. 2 below for a more detailed description of the local sensor 103). It is contemplated that if a particular UE 101 does not include a local sensor manager 107, it may nonetheless communicated with other UEs 101 that are so equipped to remotely access the functions of the respective local sensor manager 107 of the UEs 101. The UEs 101a-101n may further include a location sensor (not shown) such as a GPS module, assisted GPS module (a-GPS), or the like for determining its location with respect to, for instance, one or more GPS satellites 113. In addition or alternatively, the UEs 101a-101n may use any other location determination technology well-known in the art such as cellular triangulation, Wifi-based location determination, etc.

In one embodiment, the UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.) to present local tracking information (e.g., provided by local sensor manager 107) as well as for presenting mapping or navigation obtained via onboard location sensors (e.g., GPS receivers) or remotely provided by other UEs 101 and/or external location-based services (not shown).

By way of example, the communication network 105 of the system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof. Accordingly, in one embodiment, the system 100 links the UEs 101a-101n and the local sensor 103 over a combination of the longer range cellular network and data network (e.g., the Internet) of the communication network 105 and the local connections between one or more of the UEs 101a-101n (e.g., via the local sensor manager 107) and the local sensor 103 to provide the remote lost-and-found service described herein.

In one embodiment, the local sensor manager 107 and the local sensor management platform 109 interact according to a client-server model to provide the functions of the remote lost-and-found service. More specifically, either of the local sensor manager 107 or the local sensor management platform 109 alone or in combination may perform any of the functions of the system 100 described herein. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

By way of example, the UEs 101a-101b, the local sensor managers 107, and the local sensor management platform 109 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
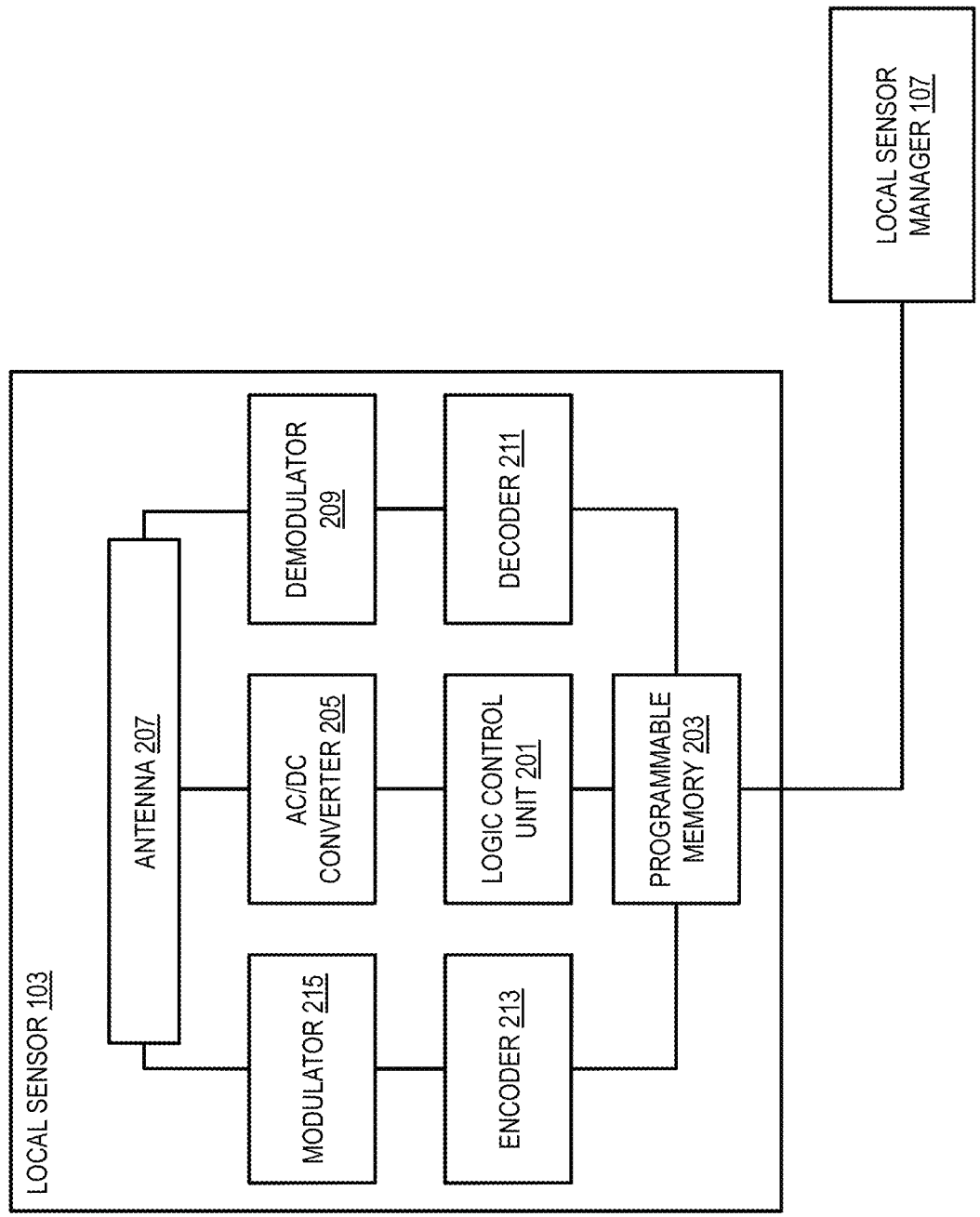
FIG. 2 is a diagram of the components of a local sensor, according to one embodiment.

FIG. 2 is a diagram of the components of a local sensor manager of a remote lost-and-found service, according to one embodiment. As described with respect to FIG. 1, the system 100 includes one or more local sensors 103 that can be attached, embedded, or otherwise associated with items so that the items may be tracked or located via a remote lost-and-found service. In one embodiment, the local sensor 103 is a transponder (e.g., an RFID tag, a near field communication (NFC) tag, etc.) comprising, at least in part, a small microchip that is attached to an antenna. By way of example, such transponders come, for instance, in a wide variety of sizes, shapes, and forms and can be read through most materials with the exception of conductive materials like water, metal, and the like.

It is noted that there are generally two types of transponders, passive transponders and active transponders, both of which may be used as local sensors 103. Passive transponders are generally smaller, lighter, and less expensive than active transponders and can be applied or attached to objects in harsh environments. They are also maintenance free and can last for years. Passive transponders are only activated when within the response range of a transponder reader or detector (e.g., the directional antenna or detector of the UE 101 described above). In one embodiment, the transponder reader or detector emits a low-power radio wave field that is used to power the passive transponder so as to pass on any information (e.g., information to identify the local sensor 103) that is contained in the transponder. Moreover, the information in passive transponders is often static and generally includes, for instance, information for specifying a static identification code. Because information in the passive transponder is static and not programmable, the local sensor manager 107 and/or the local sensor management platform 109 may dynamically associate the static identification code with a paired UE 101 during the device to local sensor pairing process. As described above, the pairing process uniquely associates a local sensor 103 and a corresponding UE 101 so that only the paired UE 101 can locate or grant visibility rights to locate the local sensor 103.

Active transponders differ in that they incorporate their own power source to transmit rather than reflect radio frequency signals. Accordingly, active tags enable a broader range of functionality like programmable and read/write capabilities. For illustration, FIG. 2 depicts the components of a local sensor 103 that is an active transponder. It is contemplated that the functions of these components may be combined in one or more components of performed by other components of equivalent functionality. As shown, an active local sensor 103 includes a logic control unit 201 to control the functions of the transmitter (e.g., receive a query from the local sensor manager 107 and/or the local sensor management platform 109 and transmit a signal in response to the query). The logic control unit 201 has connectivity to a programmable memory 203 for storing information that is to be transmitted to the transponder reader 115 (e.g., an access code or identification information associated with the local sensor 103). In certain embodiments, the stored information may also include a visibility profile (e.g., public, private, detectable, etc.) associated with the local sensor 103. In one embodiment, the programmable memory 203 is an electrically erasable programmable read-only memory (EEPROM). For example, the local sensor 103 can be dynamically programmed based at least in part on a pairing of a corresponding UE 101 and/or whether the local sensor 103 is within a local connection range with the UE 101. By way of example, the radio signals typically used to program and/or exchange information between the local sensor 103 and the UE 101 operate in the globally unlicensed Industrial, Scientific and Medical (ISM) 2.4 GHz short-range radio frequency band (e.g., Bluetooth® and other similar short-range radio links).

The programmed information includes, for instance, service-related information (e.g., local sensor profile or status such as a lost status) or other information to specify the identification of the local sensor 103, associated item, paired UE 101, related information, or a combination thereof. In one embodiment, the local sensor 103 has connectivity to the local sensor manager 107 and/or the local sensor management platform 109 for dynamically programming the programmable memory 203 based, at least in part, on pairing information, a status of the connection between the local sensor 103 and the paired UE 101 (e.g., whether the local sensor 103 is out of short-range or local radio range), proximity to other UEs 101 capable of detecting the local sensor 103, etc. The information can then be provided as a signal to trigger a specific profile or action (e.g., reporting of location information of the local sensor 103 and/or the detecting UE 101) when the local sensor 103 is detected or read. As shown in FIG. 2, the logic control unit 201 also has connectivity to an AC/DC converter 205 to in part provide electrical power to erase and reprogram the programmable memory 203.

Moreover, the local sensor 103 includes an antenna 207 for transmitting and receiving radio signals (e.g., short-range radio frequencies). When receiving a signal (e.g., a query from a reader or detector), the antenna 207 passes the received radio signal to a demodulator 209 to extract information from the radio signal (e.g., carrier wave). The information is then forwarded to a decoder 211 to decode the information for processing by the logic control unit 201. To transmit information, the logic control unit 201 retrieves the information from the programmable memory 203 and forwards it to an encoder 213. The encoder 213 then passes the encoded information to a modulator 215 for converting the information to a radio signal for transmission over the antenna 207. As noted, in one embodiment, the radio signal is signaled according to the Bluetooth® standard or a derivative thereof, for instance according to a low energy mode of the Bluetooth® standard.

Figure 3:
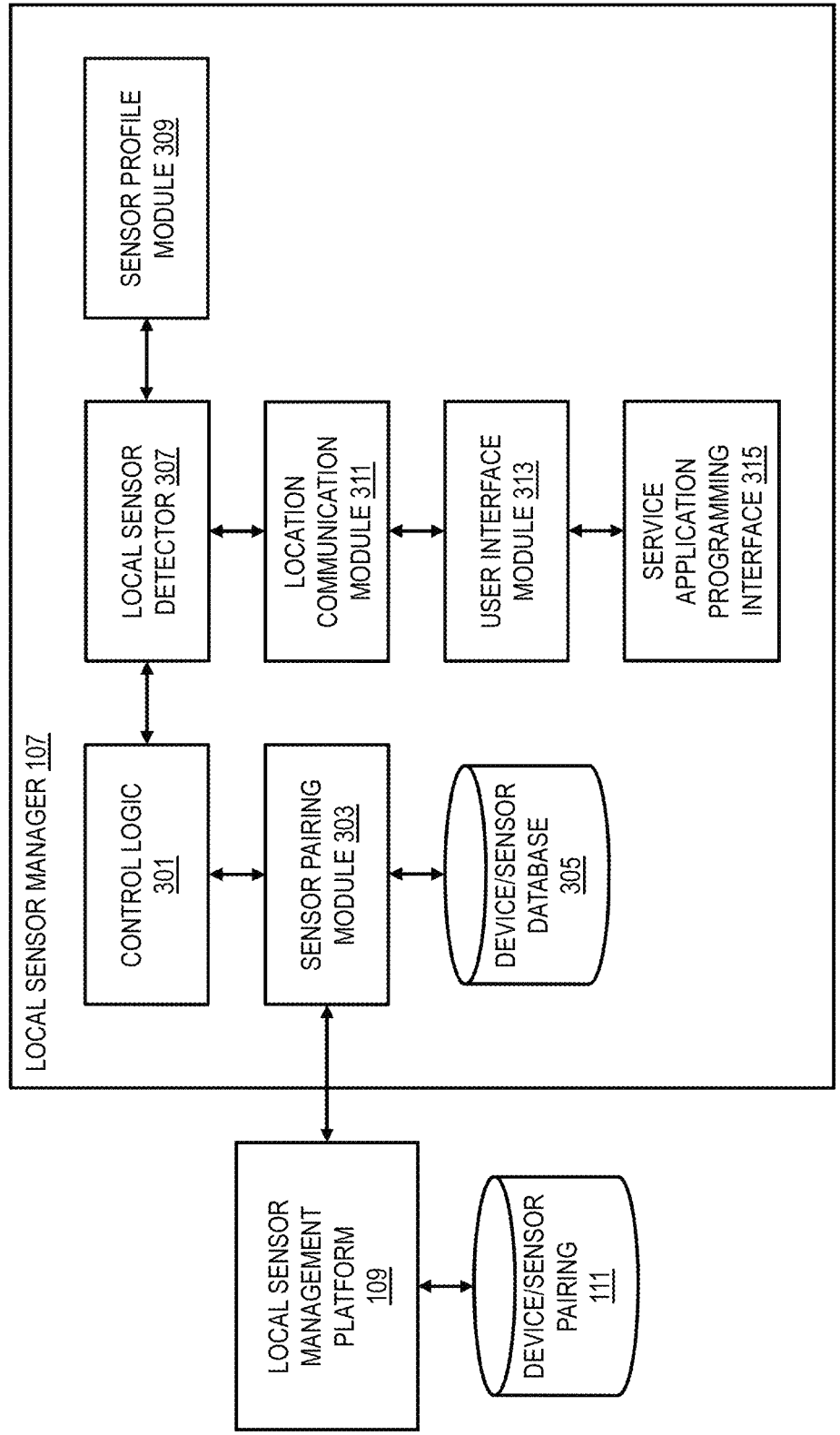
FIG. 3 is a diagram of the components of a local sensor manager of a remote lost-and-found service, according to one embodiment.

FIG. 3 is a diagram of the components of a local sensor manager of a remote lost-and-found service, according to one embodiment. By way of example, the local sensor manager 107 includes one or more components for providing a remote lost-and-found service via interaction with a local sensor 103. It is contemplated that the functions of these components may be combined in one or more components or performed by other components of equivalent functionality. For example, the local sensor management platform 109 may perform all or a portion of the functions described with respect to the local sensor manager 107 below. In this embodiment, the local sensor manager 107 includes at least a control logic 301 which executes at least one algorithm for performing the functions of the local sensor manager 107. More specifically, the control logic 301 can interact with a sensor pairing module 303 to initiate the pairing process between a local sensor 103 and a corresponding UE 101.

As noted previously, the pairing process associates the local sensor 103 with a particular UE 101 so that the UE 101 can exclusively locate or control access for locating the local sensor 103. By way of example, during the pairing process, a unique identification or access code of the local sensor 103 is saved or stored by the sensor pairing module in the device/sensor pairing database 305. Once paired, the local sensor 103 generally is not able to be paired with another UE 101 until, for instance, the original pairing is eliminated with the first paired UE 101 or the first paired UE 101 authorizes the additional pairing. In addition or alternatively, the sensor pairing module 303 may interact with the local sensor management platform 109 to store the pairing information (e.g., the access code of the local sensor 103) in device/sensor pairing database 111 of the platform 109. By storing the pairing information at a network accessible component (i.e., the platform 109), the sensor pairing module 303 enables access to the pairing information over the communication network 105 without granting direct access to the local sensor manager 107 in the UE 101. In one embodiment, the local sensor management platform 109 can make the pairing and related information available in, for instance, a web portal over the communication network 105.

After pairing is completed, the control logic 301 can direct the local sensor detector 307 to begin monitoring the local connection for the presence of the local sensor 103. In one embodiment, the local sensor detector 307 can estimate the direction (and optionally also the distance) towards the local sensor 103. By way of example, the local sensor detector 307 may include or have connectivity with an antenna array consisting of at least two non-co-located antennas for performing the direction estimation, tracking, locating, and/or positioning of the local sensor 103. This antenna array may be deployed at either the transmitter or the receiver of the local sensor detector 307. For example, if an antenna array is deployed at the receiver, the different signal propagation delays (which cause different receive signal phases and amplitudes) between a transmit antenna (e.g., in the local sensor 103) and the at least two antennas of the antenna array of the receiver (e.g., in the local sensor detector 307) enable the estimation of a direction towards the transmitter. This approach is also known as "beamforming" because an antenna array can be controlled to have a beam-shaped direction-sensitive reception sensitivity that is exploited for the direction estimation.

Moreover, it is noted that algorithms for estimating a direction of arrival based on a set of signals received with an antenna array of know aperture are well known in the art. Well-established examples of such algorithms are the MUSIC algorithm (as described in reference "Multiple Emitter Location and Signal Parameter Estimation," by R. O. Schmidt, IEEE Transactions on Antennas and Propagation, vol. 34, no. 3, pages 276-280, March 1986) and the ESPRIT algorithm (as described in reference "ESPRIT-Estimation of Signal Parameters via Rotational Invariance Techniques," by R. Roy and T. Kailath, IEEE Transactions on Acoustics, Speech and Signal Processing, vol. 37, no. 7, pp. 984-995, July 1989). Accordingly, when direction estimation is performed based on beamforming with an antenna array, the phase difference (as well as the amplitude difference) between the signals received by the antennas of the antenna array is measured (e.g., the phase and/or amplitude differences between signals received at second antenna with respect to the signal received at the first antenna). As discussed previously, the radio signals generally operate over a short-range radio frequency band (e.g., the frequency band specified in both the standard mode and low energy mode of the Bluetooth® standard). However, it is also noted the local sensor detector 307 may operate over any of various radio systems other than Bluetooth® to locate or track the local sensor 103.

If the monitoring or tracking information generated by the local sensor detector 307 indicates that the local sensor 103 is out of range of the either the receiver or transmitter of the local sensor detector 307, then the local sensor 307 may interact with the sensor profile module 309 to alter the visibility of the local sensor. In one embodiment, the change of profile is triggered after the local sensor 103 has been out of range for a predetermined period of time. In another embodiment, the profile trigger and/or the predetermined period of time may be based on other contextual information (e.g., time of day, location, date, etc.) associated with the local sensor 103 and/or the item associated with the local sensor 103. For example, if the item associated with the local sensor is a set of car keys, the out-of-range determination may not be triggered if the local sensor manager 107 determines from contextual information that the user is taking a walk rather than drive. For example, the determination may be made on based on the user obtaining walking directions rather than driving directions in a navigation service. Accordingly, it the local sensor manager 107 may infer that the user is walking and, therefore, may not need to take the car keys during the walk. Therefore, an out-of-range determination by the local sensor manager 107 would be expected and would not trigger a change in profile of the local sensor 103 associated with the car keys. It is contemplated that the user, the service provider, network operator, and the like may create policies for selecting and determining when contextual information and how contextual information should influence the sensor profile module 309.

If, however, the local sensor detector 307 determines that the out-of-range determination is valid, the sensor profile module 309, depending on user and system preferences, can change the profile of the local sensor 103 from a default private state to either the a public, detectable, or similar profile so that other UEs 101 that might be within range of the local sensor 103's radio range can detect or locate the sensor on behalf of the paired UE 101. The control logic 301 can then interact with the location communication module 311 to receive any location information associated with the local sensor 103 is transmitted by the other UEs 101 detecting the local sensor 103. In one embodiment, the other UEs 101 may report any detection or location information to the local sensor management platform 109, which can then report the location to the paired UE 101. The local sensor management platform 109 can, for instance, identified the paired UE 101 by consulting pairing information stored in the device/sensor pairing database 111.

Next, the control logic 301 can direct the user interface module 313 to present any location information received at the location communication module 311. In one embodiment, this location information received as a location coordinates generated by the other UEs 101 GPS receivers. In addition or alternatively, the location information may include the Cell-ID of the UE 101 detecting the local sensor 103. In certain embodiments, the user interface module 313 interacts with the service application programming interface (API) 315 to present the location information via other location-based services such as mapping and navigation services. In this way, the user interface module 313 may indicate the location of the local user 103 and then provide navigation instructions to reach the location. As described earlier, on reaching the location, the local sensor detector 307 can reactivate to track and/or locate the local sensor 103 using the short-range communication link for more precise tracking and location information.

Figure 4:
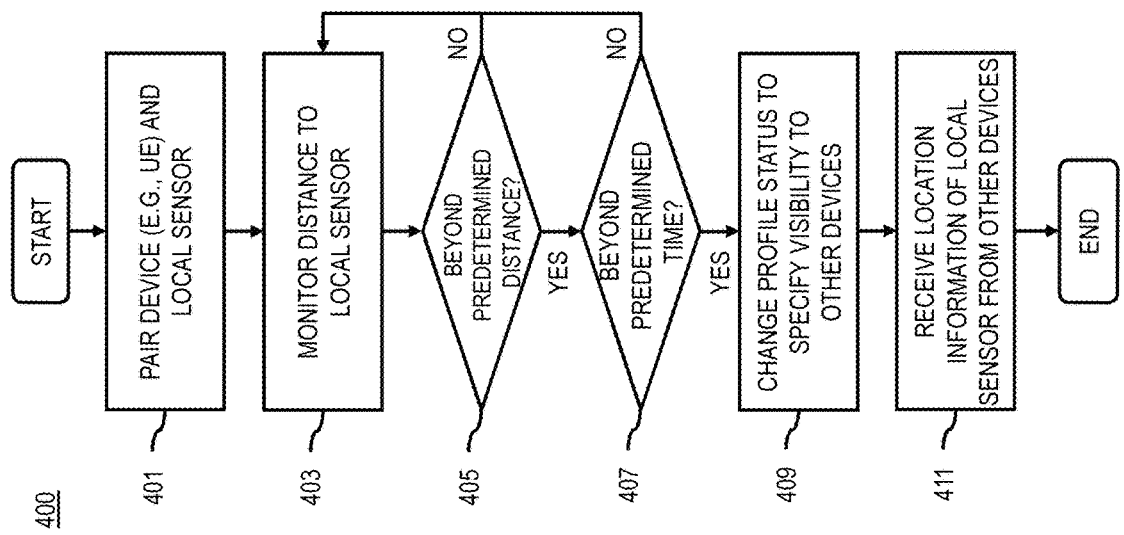
FIG. 4 is a flowchart of a process for initiating a remote lost-and-found service, according to one embodiment.
Figure 9:
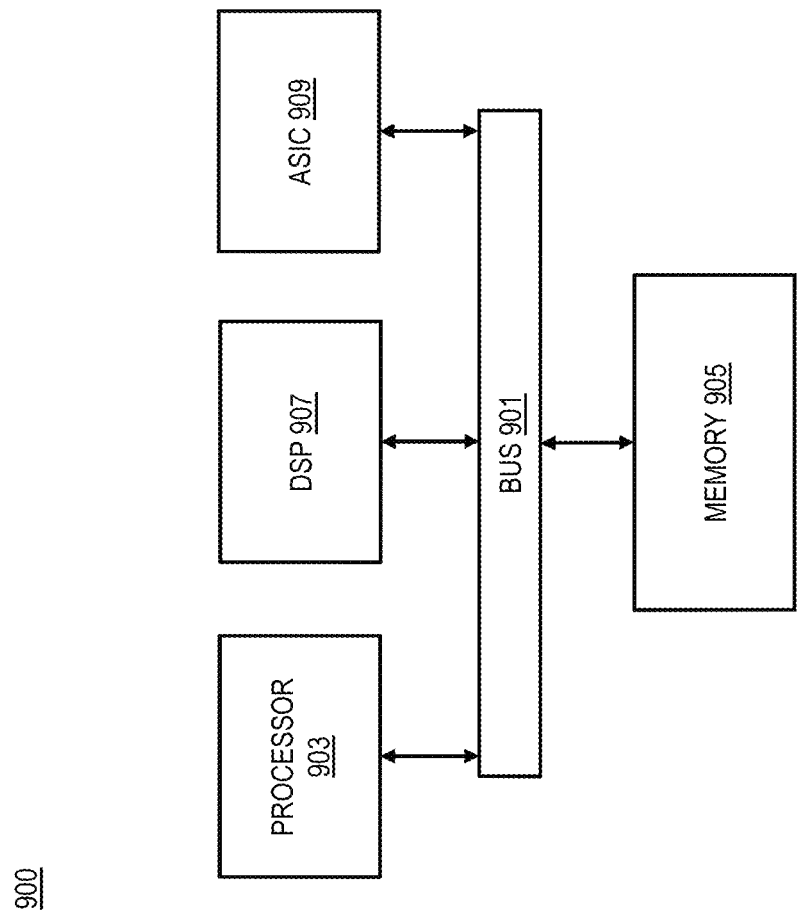
FIG. 9 is a diagram of a chip set that can be used to implement an embodiment of the invention.

FIG. 4 is a flowchart of a process for initiating a remote lost-and-found service, according to one embodiment. In one embodiment, the local sensor manager 107 performs the process 400 and is implemented in, for instance, a chip set including a processor and a memory as shown in FIG. 9. It is contemplated that the location sensor management platform 109 may perform all or a portion of the process 400 alone or in combination with the local sensor manager 107.

In step 401, the local sensor manager 107 initiates pairing of a UE 101 and a local sensor 103. As noted earlier, the local sensor 103 can be associated with any item to make the item trackable and/or otherwise locatable using the system 100. Accordingly, in addition to associating the UE 101 to a particular local sensor 103, in some embodiments, the pairing process can also match the particular item with the local sensor 103 and/or the UE 101. For example, the user can identify or describe the item in the local sensor manager 107 and/or the local sensor management platform 109. In this way, the local sensor manager 107 can identify the paired local sensor 103 by the associated item rather than the access code or other identifier associated with the local sensor 103. For instance, if the paired local sensor 103 is a set of house keys, the local sensor manager 107 can identified the corresponding local sensor 103 as house keys rather than a code.

Once paired, the local sensor manager 107 begins monitoring the distance and/or direction information to the local sensor 103 (step 403). In one embodiment, the typical working range of the radio connection between the local sensor 103 and the local sensor manager 107 is approximately 100-500 m depending on the specific radio frequency (e.g., 2.4 GHz) and other environmental conditions (e.g., sources of common radio interference such as metal, other radio sources, building materials, etc.). If the local sensor 103 is beyond a predetermined distance from the local sensor manager 107 (step 405), the local sensor manager 107 then determines whether the local sensor 103 has been beyond the predetermined distance for more than a predetermined amount of time (step 407).

By way of example, the predetermined distance is typically the maximum radio range between the local sensor 103 and the local sensor manager 107. In other words, the local sensor manager 107 determines that the local sensor 103 is beyond the predetermined distance if the local sensor manager 107 no longer receives a detectable radio signal from the local sensor. However, it is contemplated that the local sensor manager 107 may set the predetermined distance at any distance up to the maximum radio range. For example, if the item is attached to a small pet that tends to wander off, the user may set the predetermined distance to a relatively short distance. Because, the local sensor detector 307 of the local sensor manager 107 can detect both distance and direction of the local sensor 103, any distance can set independently each local sensor 103.

Similarly, the predetermined time used by the local sensor manager 107 can be set independently for each local sensor 103 or each corresponding item. The user can, for instance, set a shorter time or even eliminate any time determination altogether (e.g., by setting the predetermined time to zero), if the user wants immediate action to be taken once the local sensor 103 is out of range. For example, if the tagged item is an expensive piece of jewelry, the user may want to set a shorter time before taking action.

If neither condition of distance or time is met, the local sensor manager 107 returns to step 403 to continue monitoring. If, however, both conditions are satisfied, the local sensor manager 107 initiates a change in the profile status of the local sensor 103 to specify the visibility of the local sensor 103 to other devices (e.g., the other UEs 101*b*-101*n*). In one embodiment, the local sensor 103 may include logic for changing its own status profile based on being out of radio range with respect to its paired UE 101. In this way, the change of profile is not initiated by the local sensor manager 107. In another embodiment, the local sensor management platform 109 may initiate the change in profile status over the communication network 105. In addition or alternatively, the local sensor management platform 109 may direct another UE 101 that is within range of the local sensor 103 to initiate the change in profile status (e.g., by reprogramming the local sensor 103). The local sensor management platform 109 can, for instance, include the local sensor 103's access code in the request, so that the nearby UE 101 can authenticate itself to the local sensor 103 before initiating the change in profile.

As noted earlier, the local sensor 103's profile or status may be changed from a private profile to either a public or detectable profile if the local sensor 103 is believed to be lost. For example, the local sensor manager 107 may change the profile of the local sensor 103 from private to detectable, so that nearby devices can detect the presence and location of the device without presenting the detection or location in a user interface of the detecting devices to avoid disclosure of the information to users of the devices. Alternatively, if the profile is changed from private to public, any UE 101 and corresponding user would be able to locate and view the location of the lost local sensor 103.

After the change in visibility status or profile, the local sensor manager 107 receives the location information of the local sensor from the UEs 101 that are able to detect that the device is nearby. In one embodiment, the location information comprises the location of the detecting UE 101 when it detected the local sensor 103. This location information can be presented as GPS coordinates and/or a Cell-ID of the detecting UE 101. In another embodiment, the location information further includes direction and distance information obtained over the local connection or radio link between the detecting UE 101 and the local sensor 103. In certain embodiments, the process of obtaining location information can be encrypted and hidden from the detecting UE 101 itself. In this way, the detecting UE 101 acts to relay the location information without exposing the information to anyone other than an authorized user. Moreover, the location information of the local sensor 103 can remain not visible to the nearby UEs 101 until the local sensor manager 107 of the UE 101 paired with the local sensor 103 grants the right to view or detect the local sensor 103.

Figure 5:
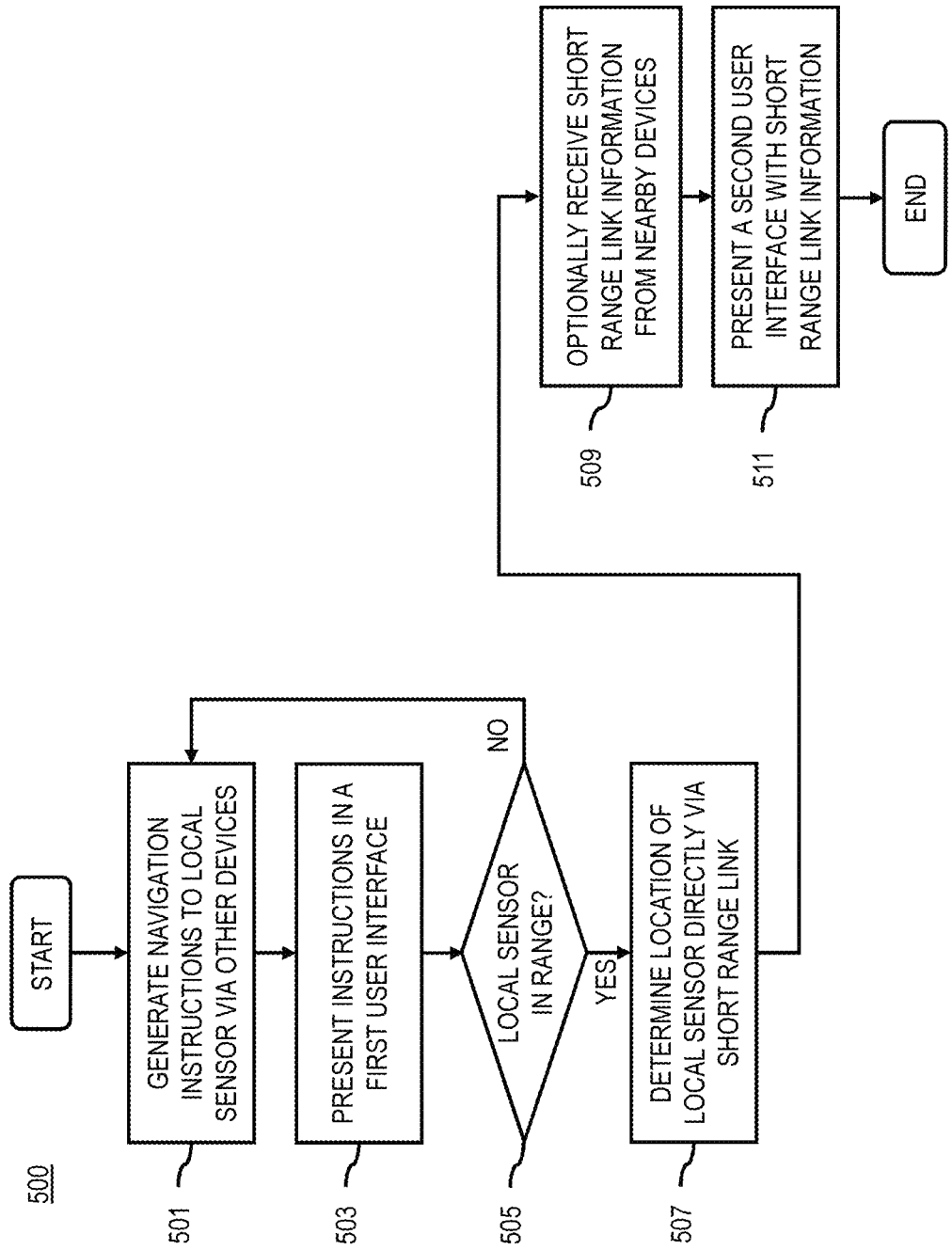
FIG. 5 is flowchart of a process for supplementing local tracking information with navigation information to locate a lost item, according to one embodiment.

FIG. 5 is flowchart of a process for supplementing local tracking information with navigation information to locate a lost item, according to one embodiment. In one embodiment, the local sensor manager 107 performs the process 500 and is implemented in, for instance, a chip set including a processor and a memory as shown in FIG. 9. It is contemplated that the location sensor management platform 109 may perform all or a portion of the process 500 alone or in combination with the local sensor manager 107. The process 500 continues from the process 400 of FIG. 4 and assumes that the local sensor manager 107 has received either location information from UEs 101 within the vicinity of the local sensor 103 or has received information that one or more other UEs 101 has detected the local sensor 103.

In step 501, based on the received location information, the local sensor manager 107 initiates generation of navigation or mapping instructions to direct the user to the location or approximate location of the local sensor 103 as determined by the other UEs 101. In one embodiment, the navigation or mapping instructions are generated using a standalone navigation service (e.g., Nokia's Ovi Maps) based on destination information provided by the local sensor manager 107. By way of example, the destination information can be transferred to the navigation service via an application programming interface, transfer file, automated copying and pasting, etc. Using, for instance, the navigation service, the location sensor manager 107 presents the navigation instructions to direct the user to the approximate location of the local sensor 103 via a first user interface (e.g., the user interface of the navigation service) (step 503).

Next, the user in conjunction with the paired UE 101 begins to travel towards the vicinity of the local sensor 103 as directed by the navigation service. Concurrently, the local sensor manager 107 continues to monitor for when the local sensor 103 is within range using, for instance, the short-range radio link (step 505). If the local sensor 101 is not in range, the local sensor manager 107 continues to provide navigation instructions via the external service. If the user reaches the approximate location of the local sensor 103 and the local sensor 103 comes within the local or short-range radio range of the local sensor manager 107, the local sensor manager 107 can begin determining the location (e.g., distance and direction) of the local sensor 103 directly using the short-range radio connection.

To improve accuracy in certain environments (e.g., high radio interference environments, environments with a lot of metal structures, etc.), the local sensor manager 107 can optionally request and receive short range radio link and direction information from nearby UEs 101 that can also detect the local sensor 103. Depending on the visibility policy in place (e.g., public vs. detectable), the other UEs 101 may not be aware that they are providing this location information to the local sensor manager 107 at that particular moment (it is assumed that the users of the other UEs 101 have previously provided consent to participate in this type of lost-and-found service and have agreed to providing the location information as a background process without additional user acknowledgement). The local sensor manager 107 can then combine the multiple sets of short range tracking information to obtain a more accurate location of the local sensor 103.

This short range link directional or location information is then provided in a second user interface. In one embodiment, this user interface is provided in a more simple graphical representation to provide the user with easier to comprehend directional information. For example, the second user interface can use a single graphical indicator (e.g., an arrow) to represent relative distance, direction, signal quality of the local or short range connection, obstacle information, and the like. Examples of such a user interface are provided below with respect to the FIGS. 7A-7F.

In this way, the process of 500 enables the local sensor manager 107 to advantageously leverage the advantages of both the long range tracking solution (e.g., GPS tracking) with the efficiency and accuracy of the local solution (e.g., NFC or other short-range radio links) to overcome each approaches respective limitations (e.g., poor indoor performance of GPS and poor range of the NFC approach).

Figure 6:
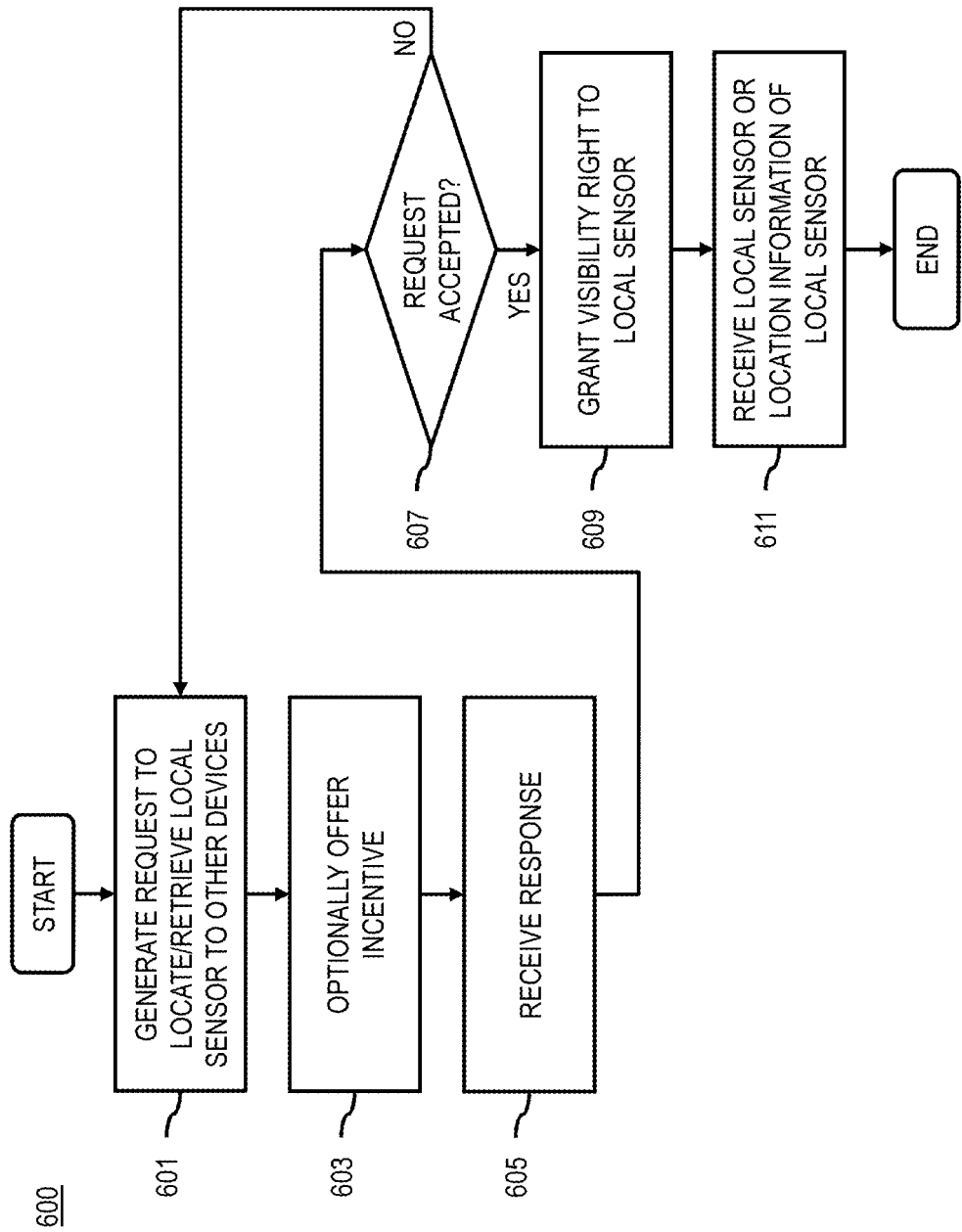
FIG. 6 is a flowchart of a process for generating a request to remotely locate and retrieve a lost item, according to one embodiment.

FIG. 6 is a flowchart of a process for generating a request to remotely locate and retrieve a lost item, according to one embodiment. In one embodiment, the local sensor manager 107 performs the process 600 and is implemented in, for instance, a chip set including a processor and a memory as shown in FIG. 9. It is contemplated that the location sensor management platform 109 may perform all or a portion of the process 600 alone or in combination with the local sensor manager 107. The process 600 continues from the process 400 of FIG. 4 and assumes that the local sensor manager 107 has received either location information from UEs 101 within the vicinity of the local sensor 103 or has received information that one or more other UEs 101 has detected the local sensor 103.

In step 601, the user of the paired UE 101 determines that he or she cannot personally locate the local sensor 103 and retrieve the associated item. For example, the local sensor 103 may be located in another town and is unable to travel to the location of the local sensor 103. In this scenario, the local sensor manager 107 and/or the local sensor management platform 109 enables the user via the UE 101 to generate a request to locate, retrieve, and then return the local sensor 113 and associated item to the user. In one embodiment, the local sensor manager 107 can initiate a communication session with one or more of the UEs 101 that are within range of the local sensor 103 to transmit the request. By way of example, the communication session may be by voice, text messaging (e.g., short message service (SMS) or multimedia messaging service (MMS)), instant messaging, online chat, etc. In some embodiments, the user, the local sensor manager 107, the local sensor management platform 109, or a combination thereof may optionally offer an incentive or a reward to encourage the one or more other UEs 101 to accept the request to locate and return the local sensor 103 and associated item (step 603).

In step 605, the local sensor manager 107 receives the response from one or more of the UEs 101. If the request is not accepted (step 607), the local sensor manager 107 can select another one of the other UEs 101 and transmit the request to the newly selected UE 101. If after several requests, the local sensor manager 107 has exhausted the available UEs 101 at which to direct the request, the local sensor manager 107 can alert the user and suggest additional options (e.g., wait until additional UEs 101 are near enough to detect the local sensor 103, increase the reward, etc.). If one of the UEs 101 accepts, the local sensor manager 107 can then grant visibility rights to the accepting UE 101 so that the local sensor 103 becomes fully locatable and viewable by the accepting UE 101 (step 609).

The accepting UE 101 can then locate and retrieve the local sensor 103 and associated item for return to the user (step 611). By way of example, the local sensor manager 107 may direct to the accepting UE 101 to return the local sensor 103 and item to a central location operated by the remote lost-and-found service affiliated with the local sensor management platform 109. When the item is received at the central location, the local sensor management platform 109 can initiate delivery of any accompanying reward to the accepting UE 101 and delivery of the item to the user or owner.

Figure 7A:
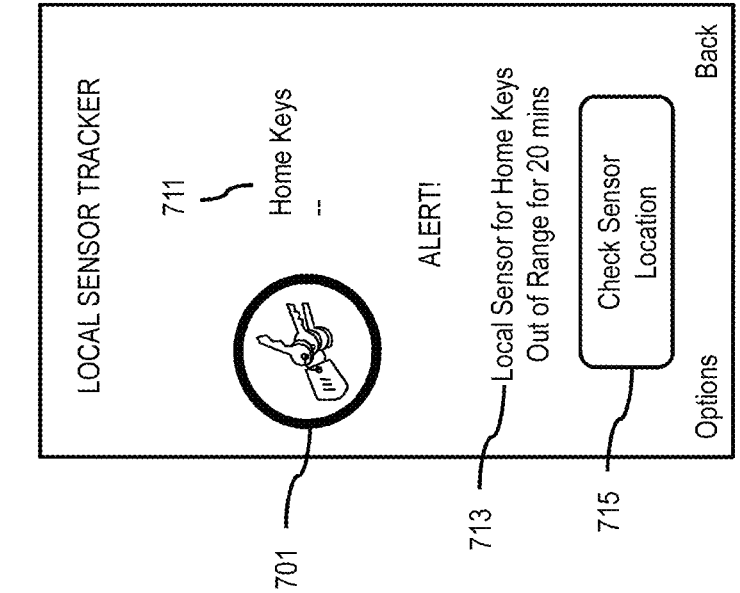

FIGS. 7A-7F are diagrams of user interfaces utilized the processes of FIGS. 4-6, according to various embodiments. As shown in FIG. 7A, the user interface 700 depicts a local sensor tracking screen employing the simplified navigation indicator described previously to direct a user to the location of tracked local sensor 103. The user interface 700 displays a representation of the item 701 associated with the local sensor 103 and also provides a description 703 of the item 701. In this example, the item 703 is within the range of the local sensor manager 107 and, therefore tracking information is available. Accordingly, the description includes a directional heading (e.g., right 62°) and a distance (e.g., 80 m) to the location of the item 701. In addition, the arrow 705 is a navigation indicator of the location with the direction of the arrow pointing to the position of the item 701, the length of the arrow 705 approximately corresponding to the distance, the thickness of the corresponding to the signal strength, and any obstacles in the path to the item 701 corresponding to a bend in the arrow (e.g., in this case, there is no obstacle in the way, so there is not bend in the arrow.

Figure 7B:
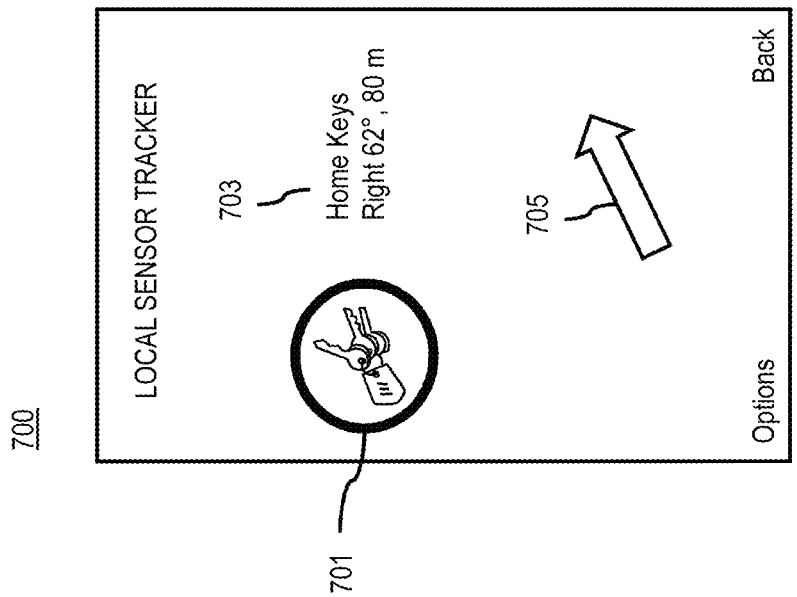

FIG. 7B depicts a user interface 710 in which the item 701 is no longer within range of the local sensor manager 107. Accordingly, the description 711 does not include the directional heading or distance provided in the user interface 700. Additionally, the user interface 710 includes an alert 713 to inform the user that the local sensor associated with the home keys (and, therefore, most likely the home keys as well) has been outside the range of the local sensor manager for 20 mins (which, in this example, is the predetermined time for determining that an item is lost). Based on the alert, an option 715 to "Check Sensor Location" can be used to determine whether the local sensor has sent its location to the local sensor management platform 109 through, for instance, any nearby UEs 101. As described previously, the lost profile for the local sensor 103 can be automatically activated when the local sensor 103 is out of range of the paired UE 101 for over the predetermined period of time. In one embodiment, activating the lost profile automatically makes the local sensor detectable, but not directly viewable, by other UEs 101 that might be nearby. These nearby UEs 101 can then report the location of the local sensor 103 to local sensor management platform 109.

Figure 7D:
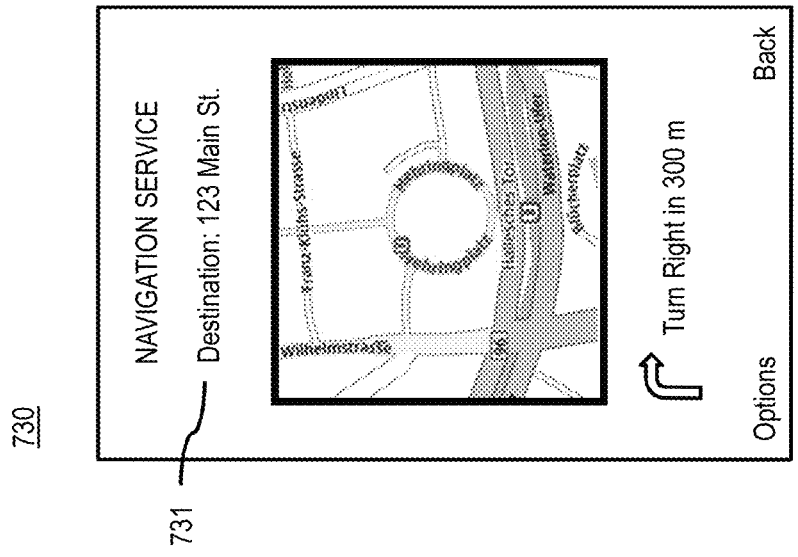
Figure 7C:
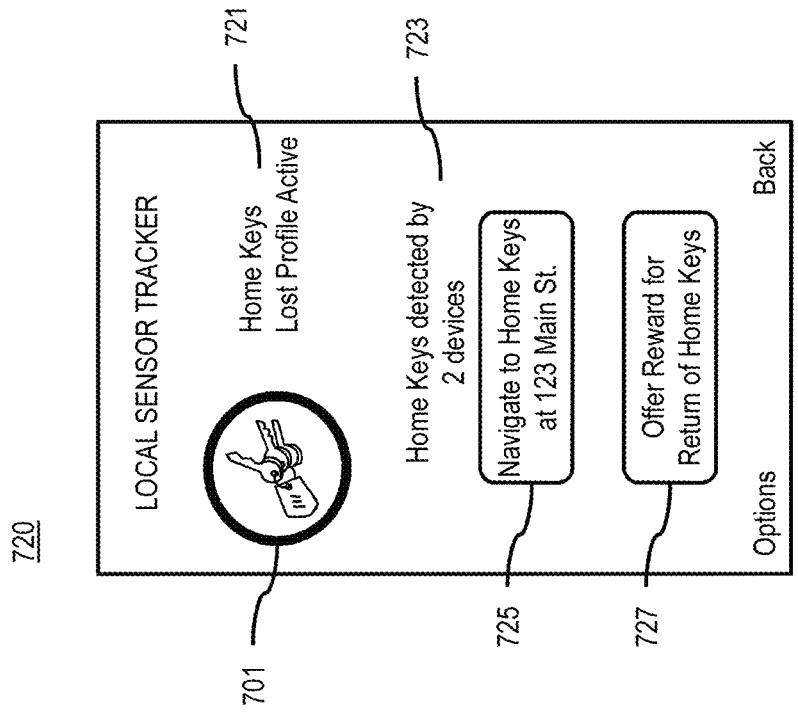

FIG. 7C depicts a user interface 720 in which the lost profile is active for the item 701. As shown, the description 721 displays a message that the local sensor manager 107 has successfully activated the lost profile for the local sensor 103. Under the lost profile, the item 701 is now detectable by other UEs 101 that might be nearby the device. In this example, the message 723 alerts the user that the item 701 (e.g., the home keys) has been detected by two devices that are within range of the item 701. In addition, the local sensor manager 107 displays an option 725 to navigate to the a location at which at least one of the devices detected item 1, and an option 727 to offer a reward to one of the two devices for the retrieval and return of the item 701.

As shown in the user interface 730 of FIG. 7D, the user has selected the option 725 to navigate to the vicinity of the item 701 as detected by the other devices. On receiving input specifying the selection, the local sensor manager 107 transfers the destination information to the navigation service user interface 730 as a destination 731. The navigation service then presents the user interface 730 to guide the user to the item 701.

As the user navigates to the item 701, the local sensor manager 107 continually monitors to determine whether the item 701 is when range of the local or short-range link. In this case, as the user reaches the destination (e.g., 123 Main St.), the item 701 is now within range. This, in turn, causes the local sensor manager 107 to overlay a message 741 on the navigation user interface 740 of FIG. 7E to alert the user that the item 701 is within local range. The message 741 also provides an option to click on the message to return to the local tracking user interface. It is contemplated that this alert message is optional. Instead, the local sensor manager 107 can automatically switch the display from the navigation user interface 740 to the local sensor tracking screen described below with respect to FIG. 7F.

FIG. 7F depicts a user interface 750 of local sensor tracking information following navigation. Similar to the user interface 700 of FIG. 7A, the local tracking user interface 750 presents a representation of the item 701 and a description 751 identifying the home keys an providing the direction (e.g., left 45°) and distance (e.g., 20 m) to the item 701 at the destination location. The navigation indicator arrow 753 again shows the relative direction (e.g., heading of the arrow), distance (e.g., in comparison, the arrow 705 of FIG. 7A is longer than the arrow 753 to represent 80 m vs. 20 m), signal strength (e.g., in comparison, the arrow 753 is thicker than the arrow 705 to indicate a higher quality radio signal because of the shorter distance to the item 701).

The processes described herein for providing a remote lost-and-found service may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
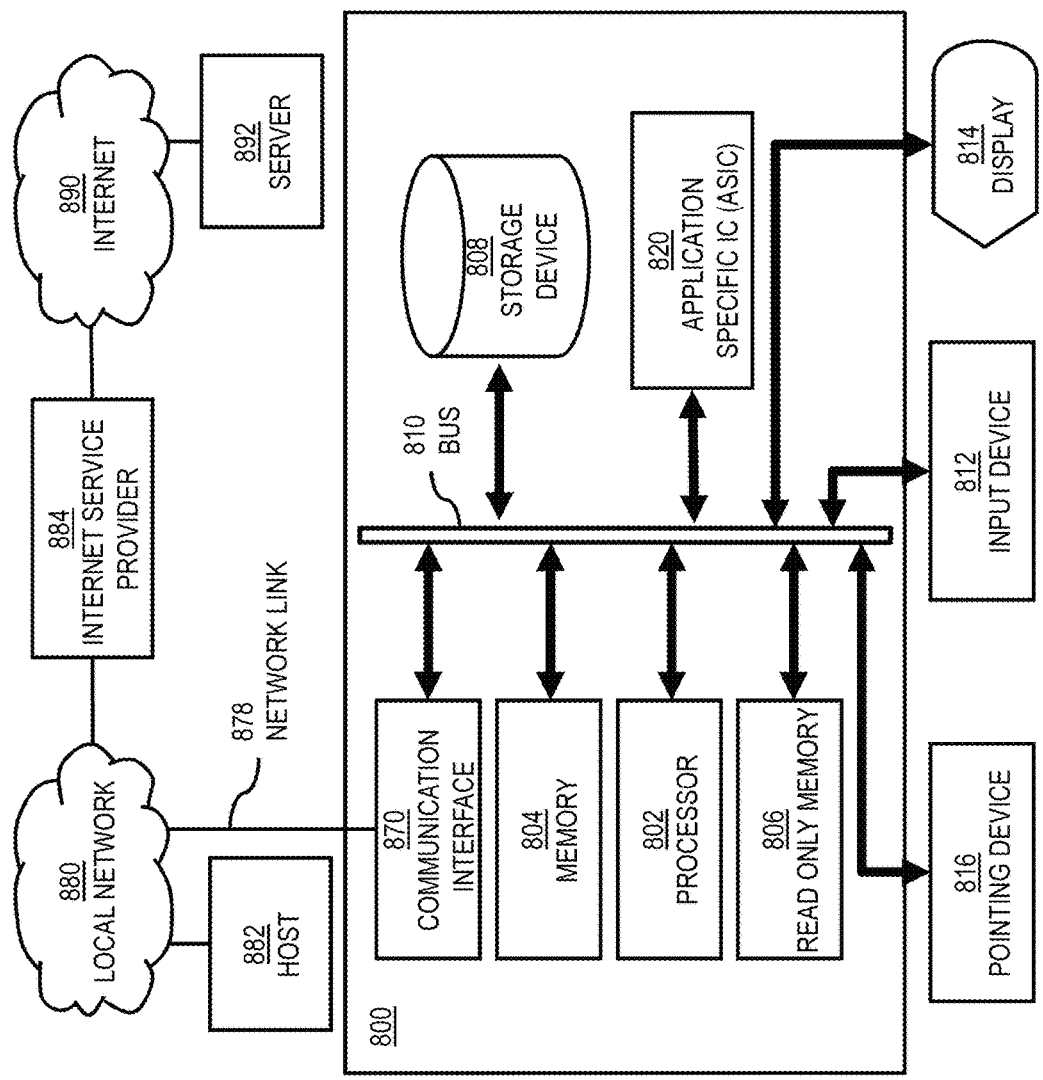
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide a remote lost-and-found service as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing a remote lost-and-found service.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to provide a remote lost-and-found service. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing a remote lost-and-found service. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing a remote lost-and-found service, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing a remote lost-and-found service to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide a remote lost-and-found service as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of services. Chip set or chip 900, or a portion thereof, constitutes a means for performing one or more steps of providing a remote lost-and-found service.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a remote lost-and-found service. The memory 905 also stores the data associated with or generated by the execution of the inventive steps.

Figure 10:
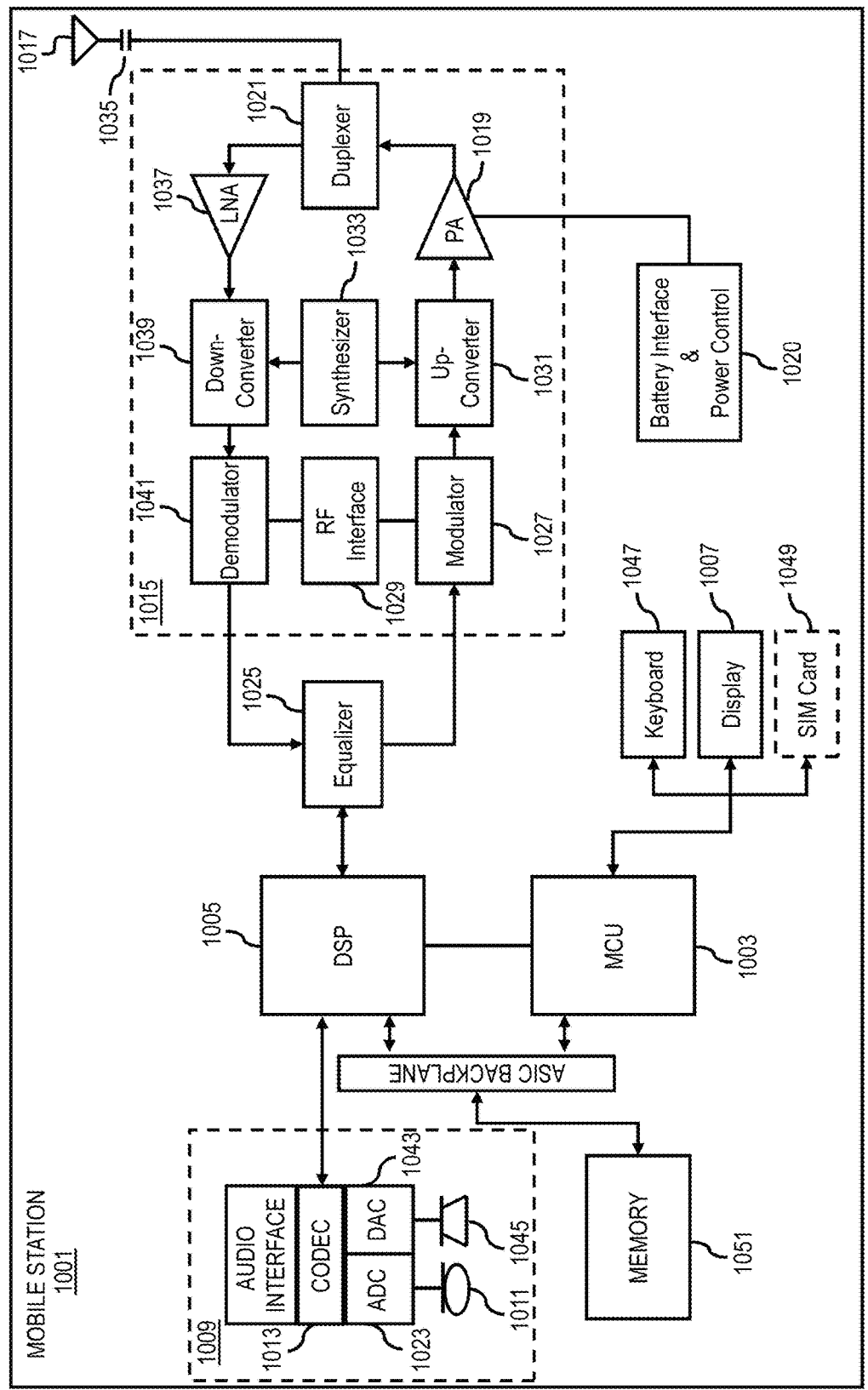
FIG. 10 is a diagram of a mobile terminal (e.g., a handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1000, or a portion thereof, constitutes a means for performing one or more steps of providing a remote lost-and-found service. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing a remote lost-and-found service. The display 10 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (L 1E) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide a remote lost-and-found service. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    initiating, by an apparatus, a pairing of a device and a local sensor, wherein the local sensor is a short-range communication transponder;
    determining, by the apparatus, that the local sensor is beyond a predetermined distance from the device for more than a predetermined time;
    initiating, by the apparatus, a transmission of a request to locate the local sensor to one or more other devices via one or more networks that include one or more wireless networks, wherein the request includes an incentive for locating the local sensor; and
    initiating, by the apparatus, a change in a profile status of the local sensor stored in the local sensor from accessible only to the device into accessible to at least one of the one or more other devices based on an access code, wherein the access code is an identifier different from a manufacturer-assigned device identifier, and wherein the change in the profile status of the local sensor is written into a programmable memory of the local sensor that stores the profile status of the local sensor, without storing a profile status of the device or a profile status of the at least one of the one or more other devices.

2. The method of claim 1, further comprising:
    receiving, by the apparatus, location information associated with the local sensor from the at least one other device, wherein the location information includes global positioning system data of the at least one other device as well as a direction and a distance that are estimated based, at least in part, on an antenna array and transmitted over a short range communication connection between the local sensor and the at least one other device, and
    wherein the local sensor authenticates the at least one other device based on the access code, and allows the change in the profile status of the local sensor stored in the local sensor as initiated by the at least one other device after the authenticating.

3. The method of claim 2, wherein the accessible only to the device is a default private state, and the accessible to at least one of the one or more other devices is a public state, wherein the determination of when the local sensor is beyond the predetermined distance is based, at least in part, on a short range communication link between the device and the local sensor, and wherein the receiving of the location information from the at least one other device is based, at least in part, on a long range communication link between the device and the at least one other device.

4. The method of claim 3, further comprising:
    initiating, by the apparatus, a presentation of a first user interface for the determination of when the local sensor is beyond the predetermined distance; and
    initiating, by the apparatus, a presentation of a second user interface for the location information from the at least one other device,
    wherein the first user interface and the second interface respectively include a navigation indicator user interface, a mapping service user interface, a navigation service user interface, a location service user interface, or a combination thereof,
    wherein the device and the one or more other devices include wireless communication devices, and the local sensor is an active short-range communication transponder.

5. The method of claim 1, further comprising:
determining, by the apparatus, the local sensor as within the predetermined distance when the local sensor is beyond the predetermined distance while one or more contextual criteria of the local sensor with respect to a user of the device other than the predetermined distance are met,
wherein the apparatus is a server connected to the device and the one or more other devices via the one or more networks.

6. The method of claim 5, wherein the local sensor is included in a car key, and the one or more contextual criteria include a time of day, a location, a date, or a combination thereof of one or more non-driving user activities, and wherein the access code is user-assigned.

7. The method of claim 1, further comprising:
receiving, by the apparatus, a response from the at least one other device; and
granting, by the apparatus, to the at least one other device an access right to access the local sensor based on the response,
wherein the access right to access the local sensor is based, at least in part, on the access code, and
wherein the apparatus is embedded in the device.

8. A method comprising:
detecting, by a local device, a local sensor within a predetermined distance;
transmitting, by the local device to a device paired with the local sensor via a lost-and-found service, location information associated with the local sensor as a background process without acknowledgement of a user of the local device, based on a participation to the lost-and-found service by the local device;
receiving an access code from the device paired with the local sensor; and
initiating, by the local device, a change in a profile status of the local sensor stored in the local sensor from visible only to the device into visible to at least the local device based on the access code,
wherein the access code is an identifier different from a manufacturer-assigned device identifier, and wherein the change in the profile status of the local sensor is written into a programmable memory of the local sensor that stores the profile status of the local sensor, without storing a profile status of the device or a profile status of the at least the local device.

9. The method of claim 8, wherein the change in the profile status of the local sensor is written into a programmable memory of the local sensor, and wherein when in a state of the visible only to the device, the local sensor is detectable by non-paired devices but whose location information is accessible only by paired devices.

10. The method of claim 9, wherein the local sensor authenticates the local device based on the access code, and allows the change in the profile status of the local sensor as initiated by the local device after the authenticating, and
wherein the local sensor is an radio-frequency identification tag or a near field communication tag.

11. An apparatus comprising:
at least one processor; and
at least one memory including computer program code for one or more programs,
the at least one memory and the computer program code configured to, with the at least one processor, cause the apparatus to perform at least the following,
initiate a pairing of a device and a local sensor, wherein the local sensor is a short-range communication transponder;
determine that the local sensor is beyond a predetermined distance from the device for more than a predetermined time;
initiate a transmission of a request to locate the local sensor to one or more other devices via one or more networks that include one or more wireless networks, wherein the request includes an incentive for locating the local sensor; and
initiate a change in a profile status of the local sensor stored in the local sensor from accessible only to the device into accessible to at least one of the one or more other devices based on an access code, wherein the access code is an identifier different from a manufacturer-assigned device identifier, and wherein the change in the profile status of the local sensor is written into a programmable memory of the local sensor that stores the profile status of the local sensor, without storing a profile status of the device or a profile status of the at least one of the one or more other devices.

12. The apparatus of claim 11, wherein the apparatus is further caused to:
receive location information associated with the local sensor from the at least one other device,
wherein the local sensor authenticates the at least one other device based on the access code, and allows the change in the profile status of the local sensor stored in the local sensor as initiated by the at least one other device after the authenticating.

13. The apparatus of claim 12, wherein the determination of when the local sensor is beyond the predetermined distance is based, at least in part, on a short range communication link between the device and the local sensor, and wherein the receiving of the location information from the at least one other device is based, at least in part, on a long range communication link between the device and the at least one other device.

14. The apparatus of claim 13, wherein the apparatus is further caused to:
initiate a presentation of a first user interface for the determination of when the local sensor is beyond the predetermined distance; and
initiate a presentation of a second user interface for the location information from the at least one other device,
wherein the first user interface and the second interface respectively include a navigation indicator user interface, a mapping service user interface, a navigation service user interface, a location service user interface, or a combination thereof.

15. The apparatus of claim 11, wherein the apparatus is further caused to:
determine the local sensor as within the predetermined distance when the local sensor is beyond the predetermined distance while one or more contextual criteria of the local sensor with respect to a user of the device other than the predetermined distance are met.

16. The apparatus of claim 15, wherein the local sensor is included in a car key, and the one or more contextual criteria include a time of day, a location, a date, or a combination thereof of one or more non-driving user activities.

17. The apparatus of claim 11, wherein the apparatus is further caused to:
receive a response from the at least one other device; and
grant an access right to the at least one other device based on the response,
wherein the access right of the local sensor is based, at least in part, on the access code.

18. An apparatus comprising:
at least one processor; and
at least one memory including computer program code for one or more programs,
the at least one memory and the computer program code configured to, with the at least one processor, cause the apparatus embedded in a local device to perform at least the following,
detect a local sensor within a predetermined distance;
transmit, to a device paired with the local sensor via a lost-and-found service, location information associated with the local sensor as a background process without acknowledgement of a user of the local device, based on a participation to the lost-and-found service by the local device;
receive an access code from the device paired with the local sensor, wherein the access code is an identifier different from a manufacturer-assigned device identifier; and
initiate a change in a profile status of the local sensor stored in the local sensor from visible only to the device into visible to at least the local device based on the access code,
wherein the access code is an identifier different from a manufacturer-assigned device identifier, and wherein the change in the profile status of the local sensor is written into a programmable memory of the local sensor that stores the profile status of the local sensor, without storing a profile status of the device or a profile status of the at least the local device, and
wherein the local sensor is a short-range communication transponder.

19. The apparatus of claim 18, wherein the change in the profile status of the local sensor is written into a programmable memory of the local sensor that stores the profile status of the local sensor, without storing a profile status of the device or a profile status of the local device, and wherein when in a state of the visible only to the device, the local sensor is detectable by non-paired devices but whose location information is accessible only by paired devices.

20. The apparatus of claim 19, wherein the local sensor authenticates the local device based on the access code, and allows the change in the profile status of the local sensor as initiated by the local device after the authenticating.

* * * * *